United States Patent
Sudheendra et al.

(10) Patent No.: US 9,767,583 B2
(45) Date of Patent: Sep. 19, 2017

(54) METHOD AND DEVICE FOR PACKING MULTIPLE IMAGES

(75) Inventors: Pavan Sudheendra, Bangalore (IN); Rajagopalan Venkata Raghavan, Bangalore (IN); Yogesh Manav, Bangalore (IN); Rajaram Hanumantacharya Naganur, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 484 days.

(21) Appl. No.: 13/567,628

(22) Filed: Aug. 6, 2012

(65) Prior Publication Data

US 2013/0033634 A1 Feb. 7, 2013

(30) Foreign Application Priority Data

Aug. 4, 2011 (IN) .......................... 2685/CHE/2011
Jul. 30, 2012 (KR) ....................... 10-2012-0083061

(51) Int. Cl.
  G09G 5/377 (2006.01)
  G06T 11/60 (2006.01)
(52) U.S. Cl.
  CPC .................................. G06T 11/60 (2013.01)
(58) Field of Classification Search
  USPC ..................................................... 348/333.05
  See application file for complete search history.

(56) References Cited

U.S. PATENT DOCUMENTS 8,797,361 B2 * 8/2014 Goh .............................. 345/651
2005/0234981 A1 * 10/2005 Manousos et al. ....... 707/103 Y
2007/0024913 A1 2/2007 Jeong
2008/0144107 A1 * 6/2008 Lieb ...................... G06T 11/60
  358/1.18
2009/0022424 A1 * 1/2009 Chen et al. ................... 382/284
2009/0138817 A1 * 5/2009 Oron et al. .................... 715/788
2011/0074824 A1 3/2011 Srinivasan et al.
2011/0102607 A1 * 5/2011 Toda .......................... 348/207.2
2011/0176720 A1 * 7/2011 Van Osten et al. ........... 382/154

FOREIGN PATENT DOCUMENTS

EP       1 583 036      10/2005
KR     10-0727961       6/2007

OTHER PUBLICATIONS

European Search Report dated Oct. 27, 2015 issued in counterpart application No. 12179307.9-1906, 15 pages.

* cited by examiner

*Primary Examiner* — Roberto Velez
*Assistant Examiner* — Yih-Sien Kao
(74) *Attorney, Agent, or Firm* — The Farrell Law Firm, P.C.

(57) ABSTRACT

A method and apparatus are provided for packing a plurality of images. A number of cells of a canvas on which the plurality of images having different aspect ratios are to be packed is determined. The cells on the canvas are merged such that a number of the plurality of images is equal to the number of the cells. Each of the plurality of images are placed in a corresponding one of the plurality of cells of the canvas, according to respective aspect ratios of the plurality of images, when the number of the plurality of images is equal to the number of the cells.

20 Claims, 12 Drawing Sheets

METHOD AND DEVICE FOR PACKING MULTIPLE IMAGES

PRIORITY

This application claims priority under 35 U.S.C. §119(a) to an Indian Patent Application filed in the Indian Patent Office on Aug. 4, 2011 and assigned Serial No. 2685/CHE/2011 and a Korean Patent Application filed in Korean Intellectual Office on Jul. 30, 2012 and assigned Serial No. 10-2012-0083061, the contents of which are incorporated herein by reference.

BACKGROUND OF THE INVENTION

1. Field of the Invention

The present invention relates generally to a digital image system, and more particularly, to a method and device for packing a plurality of digital images.

2. Description of the Related Art

Digital images may be captured by digital cameras and saved on memory cards. In addition to dedicated cameras, digital cameras are present in various types of devices, such as, for example, mobile phones, tablets, Personal Digital Assistants (PDAs) and other portable communication devices. With the technological advancements in digital cameras and memory cards, users are capturing large amounts of images and/or videos. Further, User Generated Content (UGC) websites have enabled users to upload their images, or other visual contents, for sharing with other users. The captured images may also be stored in the memory device of a camera or a computer, or may be uploaded to a remote location and viewed on electronic displays. Most of the time, captured images are not repurposed beyond individual image prints. In addition, with the amount of digital visual content available to users, a large amount of visual contents must be efficiently displayed in a limited space and time.

To efficiently display a large amount of visual content in a limited space and time, panorama views may be formed or collages may be created.

A user can share, edit, organize, manage and enhance the captured images through the use of image editors, and other software tools, to form panorama views or to create collages. Collages are created by combining several images on a single canvas, and may be created for special events such as, for example, a holiday, a wedding, or an anniversary.

The creation of a collage includes the essential step of packing/arranging the images on a canvas in an artistic manner. The simplest method of arranging digital images, or other visual content, in a limited space is to manually pack the visual content in the allocated space in an artistic manner.

Current digital imaging technologies enable automated packing of images of a consistent size, which may be provided from the same source. A group of digital images are selected, which are distributed in a predesigned pattern, to form an image collage. The image collage can be a stand-alone digital image. Some automated packing techniques focus on collecting images having the same size and aspect ratio. The automated packing techniques are limited when images are collected from different sources or when images are captured using cameras having different orientations, i.e., images may have a portrait orientation (where the height of the image is greater than the width of the image) or they may have a landscape orientation (where the width of the image is greater than the height of the image).

Further, other packing techniques force significant portions of images to be cropped or obscured for effective packing of the images. Furthermore, some packing techniques overlap or rotate individual images to optimize packing.

SUMMARY OF THE INVENTION

The present invention has been made to address at least the above problems and/or disadvantages and to provide at least the advantages described below. Accordingly, an aspect of the present invention provides a device and method for packing a plurality of images to enable efficient packing of visual contents on a canvas, while avoiding overlaps and void spaces between the visual contents.

Further, another aspect of the present invention provides a method and device for packing a plurality of images to enable packing of visual contents based on their aspect ratios.

According to an aspect of the present invention, a method is provided for packing a plurality of images. A number of cells of a canvas on which the plurality of images having different aspect ratios are to be packed is determined. The cells on the canvas are merged such that a number of the plurality of images is equal to the number of the cells. Each of the plurality of images are placed in a corresponding one of the plurality of cells of the canvas, according to respective aspect ratios of the plurality of images, when the number of the plurality of images is equal to the number of the cells.

According to another aspect of the present invention, an image capturing device is provided for packing a plurality of images. The image capturing device includes a memory for storing the plurality of images. The image capturing device also includes a processing unit for determining a number of cells of a canvas on which the plurality of images having different aspect ratios are to be packed, merging the cells on the canvas such that a number of the plurality of images is equal to the number of the cells, and placing each of the plurality of images in a corresponding one of the plurality of cells of the canvas, according to respective aspect ratios of the plurality of images, when the number of the plurality of images is equal to the number of the cells.

BRIEF DESCRIPTION OF THE DRAWINGS

The above and other aspects, features and advantages of the present invention will be more apparent from the following detailed description when taken in conjunction with the accompanying drawings, in which.

Figure 1:
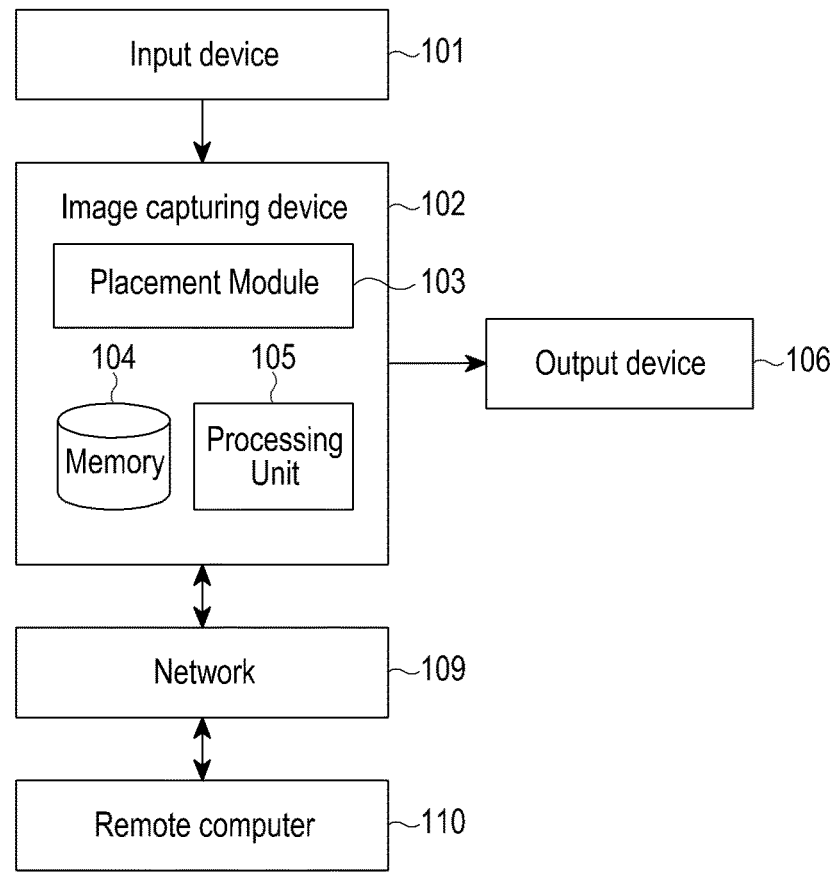
FIG. 1 is a block diagram illustrating an image placement module system, according to an embodiment of the present invention.

DETAILED DESCRIPTION OF EMBODIMENTS
OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. The examples used herein are intended merely to facilitate an understanding of ways in which the embodiments of the present invention may be practiced, and to further enable those of skill in the art to practice the embodiments herein. Accordingly, the examples should not be construed as limiting the scope of the embodiments of the present invention.

The embodiments of the present invention provide a method to efficiently pack digital visual content on a canvas.

Throughout the present specification, "visual content" and "images" are used interchangeably. An image can be any digital image, such as, for example, raster images or bitmap images. Further, the images can be captured by a means of a digital camera, a similar device, and/or other methods that employ an analog medium, such as photographs, photographic film, or printed paper, by an image scanner or similar device.

Further, throughout the present specification, "display" and "canvas" are used interchangeably. The display can be a canvas, an electronic display, or hard copies generated from printers, which can display a packed image on a user interface.

FIG. 1 is a block diagram illustrating an image placement module system, according to an embodiment of the present invention.

An image capturing device 102 includes a memory 104, a processing unit 105 and a placement module 103.

The memory 104 stores captured images, or any other visual content.

The processing unit 105 fetches the captured images and processes the images. The processing unit 105 determines aspect ratios of the images and sorts the images based on the aspect ratios. The captured images are transferred to the placement module 103, where the images are packed to produce an artistic presentation. In an embodiment of the present invention, the placement module 103 directly receives at least one image captured by the image capturing device 102.

Alternatively, the processing unit 105 may perform the same function as the placement module 103. Thus, the processing unit 105 fetches the captured images, determines aspect ratios of the images to categorize the images, and packs the images on the canvas to produce an artistic presentation.

In an embodiment of the present invention, the images can be received from a digital camera, which enables users to capture images and save them in a digital format in the memory/database 104. The digital camera may be a stand-alone device or may be a part of another device, such as, for example, a mobile device or a PDA. The images can be provided to the placement module 103 through a mobile device, a camera, a database, the memory 104, a PDA, a scanner, a Compact Disk (CD), or a Digital Versatile Disc (DVD). The images are packed by the placement module 103 and are displayed on output, such as a screen/monitor, a personal computer, a PDA, a mobile device, or a digital picture frame, or a hardcopy is printed from printers.

In another embodiment of the present invention, the image capturing device 102 interacts with at least a remote computer 110 over a network 109, such as the Internet. The network 109 can be any wired or wireless communication network.

The remote system is established to provide image services and products over the network 109. The remote system includes at least one image rendering facility and data center. The image capturing device 102 receives images from a data center of the remote system over the network 109. Further, the images are delivered over the Internet, through e-mail, from the remote system to the image placement module 103 for packing.

The image placement module 103 processes and packs the received images. The packed images are delivered and rendered on the remote system.

An input device 101 is a device for inputting a command to execute a control or function with respect to the image capturing device 102, and may include any device capable of performing an input function.

An output device 106 is a device for displaying the image captured or stored in the image capturing device 102, and may include any device capable of performing an output function.

In an embodiment of the present invention, the processing unit 105 determines aspect ratios of the images to categorize the images, and packs the images on the canvas to produce an artistic presentation.

Figure 2:
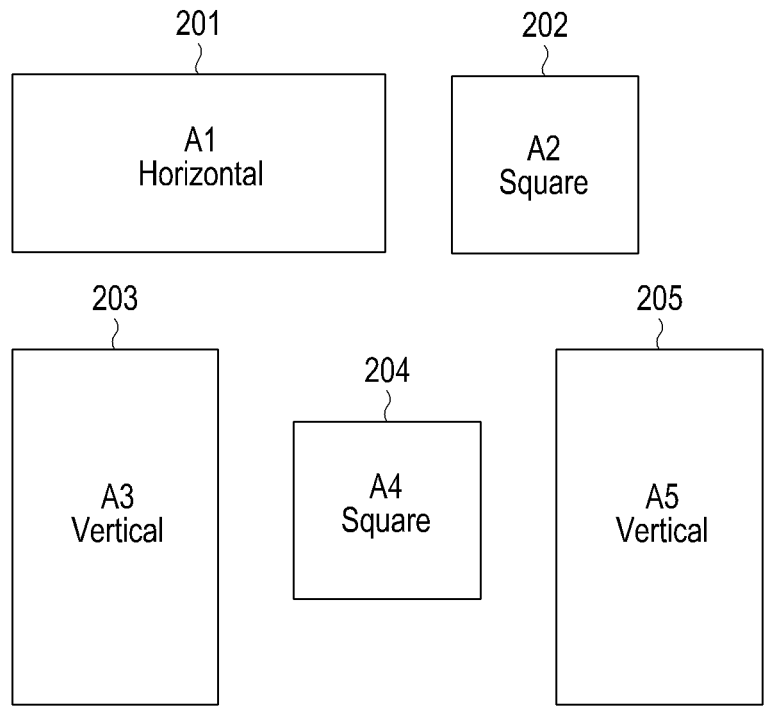
FIG. 2 is a diagram illustrating a set of input images provided to the image placement module system, according to an embodiment of the present invention.

FIG. 2 is a diagram illustrating a set of input images provided to the image placement module system, according to an embodiment of the present invention.

A user can select at least one image, or any type of visual content to be packed. The size of the display or canvas, on which the images are to be placed, can also be selected by the user. The images can be of any size forming a rectangle and/or a square. The images to be packed can be sorted according to their aspect ratio. The input images can be sorted in ascending order of their aspect ratio.

FIG. 2 illustrates five images A1 201, A2 202, A3 203, A4 204 and A5 205, which need to be packed and displayed. The images have different orientations, including a portrait orientation (A3 203 and A5 205), a landscape orientation (A1 201), and a square orientation (A2 202 and A4 204. The system can pack/place a large number of images on a canvas/display.

Figure 3:
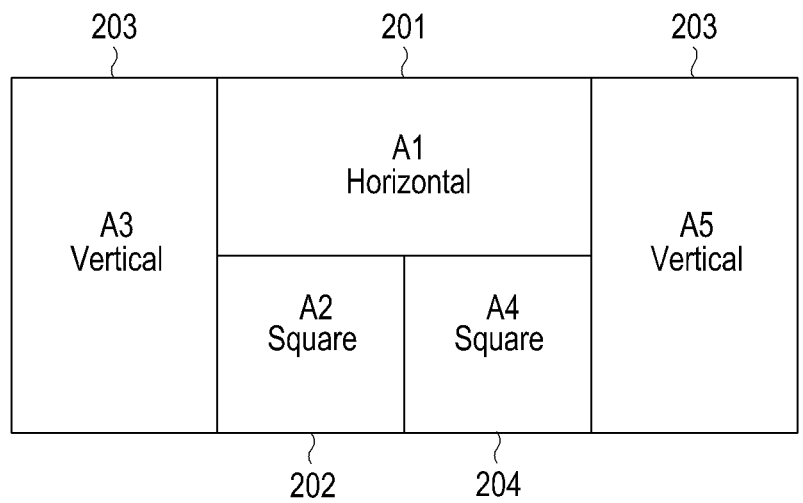
FIG. 3 is a diagram illustrating a canvas displaying packed images, according to an embodiment of the present invention.

FIG. 3 is a diagram illustrating a canvas displaying packed images, according to an embodiment of the present invention.

An image placement module system can place all of the input images A1 201, A2 202, A3 203, A4 204 and A5 205 by packing the images on the display or canvas at specific places, such that the aspect ratios of the packed images are matched to the original image's aspect ratio.

Figure 4:
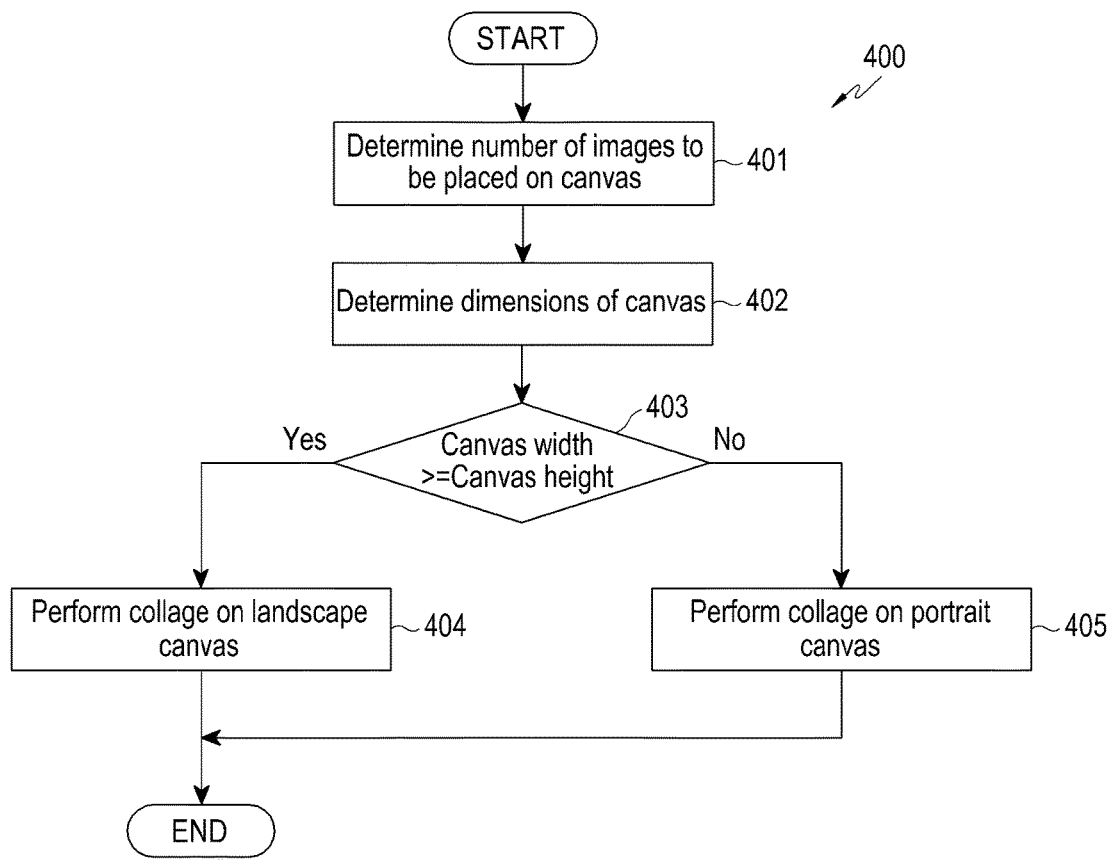
FIG. 4 is a flow chart illustrating a process for determining the size of the canvas, according to an embodiment of the present invention.

FIG. 4 is a flow chart illustrating a process 400 for determining the size of the canvas, according to an embodiment of the present invention.

Referring to FIG. 4, a set of images 'M' to be packed together on a canvas is determined, in step 401. The dimensions of the canvas are determined, in step 402.

The dimensions of the canvas are analyzed, in step 403, to determine whether the canvas has a landscape or portrait orientation. A canvas having a width that is greater than its height has a landscape orientation, while a canvas having a height that is greater than its width has a portrait orientation. Thus, if it is determined that the canvas width is greater than or equal to the canvas height, packing is performed on a landscape canvas, in step 404.

If it is determined that the canvas width is less than the canvas height, packing is performed on a portrait canvas, in step 405.

The various steps of FIG. 4 can be performed in the order presented, in a different order or simultaneously. Further, in some embodiments of the present invention, one or more steps of FIG. 4 can be omitted.

Figure 5:
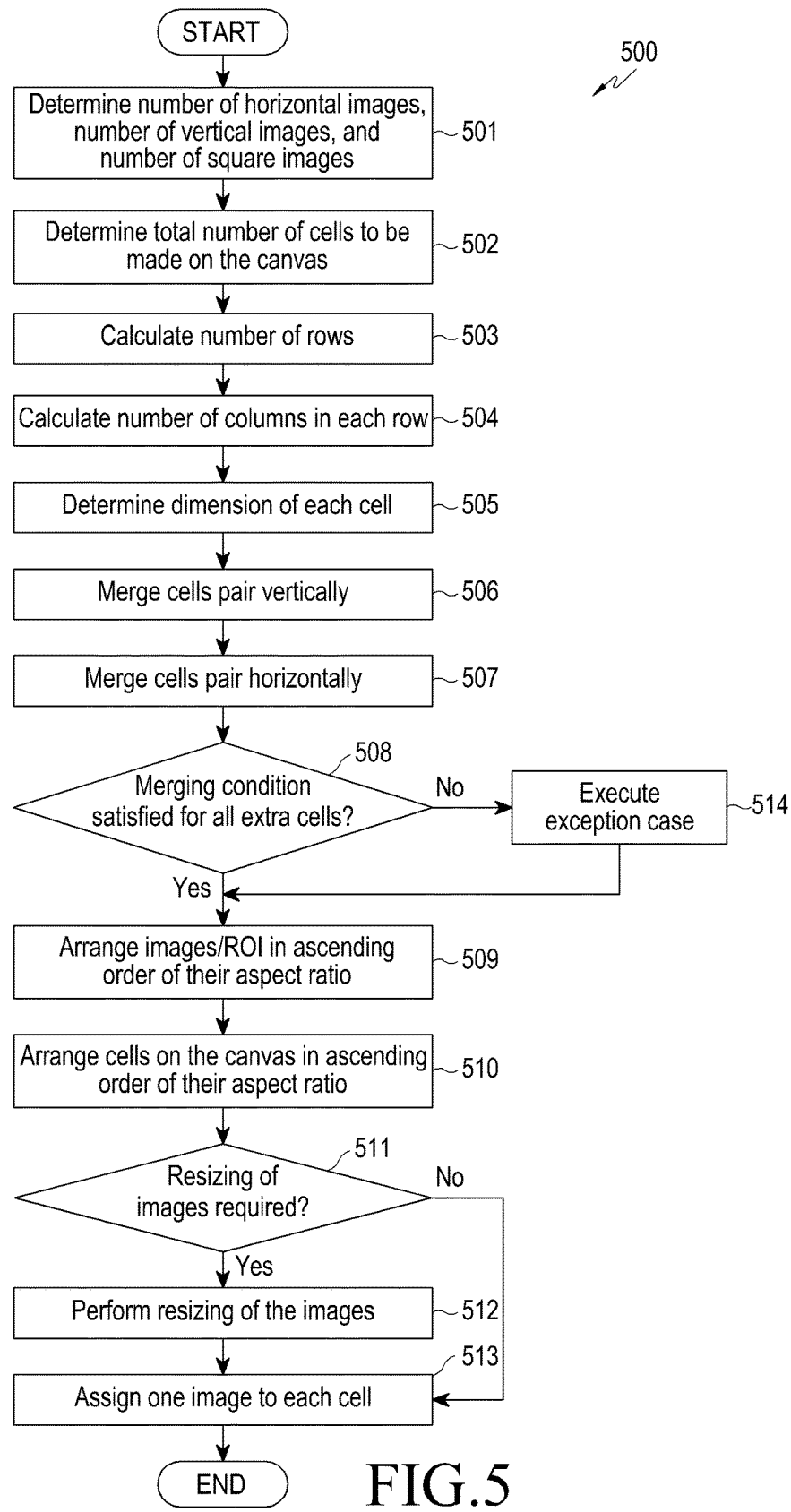
FIG. 5 is a flow chart illustrating a process of image placement when a canvas has a landscape orientation, according to an embodiment of the present invention.

FIG. 5 is a flow chart illustrating a process 500 of image placement when a canvas has a landscape orientation, according to an embodiment of the present invention.

Referring to FIG. 5, the images to be packed are categorized according to their aspect ratios. Among the input images, numbers of images having landscape, portrait, and square orientations can be determined, in step 501.

A total number of cells 'N' to be made on the canvas is determined, in step 502, by adding the total number of input images 'M', the number of input images having a landscape orientation 'K1', and the number of images having a portrait orientation 'K2', as set forth in Equation (1) below.

$$N = M + K1 + K2 \quad (1)$$

The canvas is fragmented into one or more rows, in step 503. The number of rows 'RowCount' on the canvas can be determined by taking the square root of the total number of cells created on the canvas as set forth in Equation (2) below.

$$RowCount = \sqrt{N} \quad (2)$$

The number of columns in each row is calculated, in step 504, as described in detail below with respect to FIG. 6. The dimensions of each cell are determined, in step 505, as described in detail below with respect to FIG. 7.

Once the dimension of each cell is determined, the extra cells present on the canvas can be merged. A pair of identically-dimensioned cells, which lie in different rows but in the same column, are merged together vertically, in step 506. Vertical merging of the cells is described in detail below with reference to FIG. 8. A pair of identically-dimensioned cells, which lie in the same row and are adjacent to each other, are merged together horizontally, in step 507. Horizontal merging of the cells is described in detail below with reference to FIG. 9.

All portrait and/or landscape orientation cells are checked to determine whether they satisfy the aforementioned merging conditions, in step 508. If at least one of the portrait and/or landscape orientation cells does not satisfy the merging conditions, the number of extra cells needs to be reduced.

The number of extra cells can be reduced by executing the exception case, in step 514. In the exception case merging is performed with respect to the extra cells, which do not satisfy the merging conditions. Specifically, the cells that do not have identical dimensions are merged, as described in detail below with reference to FIG. 13.

Once all the extra cells are merged, the number of cells on the canvas is equal to the number of images to be packed.

The images, or Regions Of Interest (ROI), which need to be packed on the canvas are sorted in ascending order, based on their aspect ratios, in step 509. The cells on the canvas are sorted in ascending order, based on their aspect ratios, in step 510. The sizes of the images are checked against the sizes of the cells to determine if the images can fit into the cell, in step 511.

If the sizes of the images do not map to the sizes of the cells, the images are resized according to the sizes of the cell in order to fit properly in to the cell, in step 512. Properly sized images are assigned to each cell, in step 513, thereby creating an artistic pattern for the packed images.

The steps of FIG. 5 can be performed in the order presented, in a different order or simultaneously. Further, in embodiments of the present invention, some steps of FIG. 5 can be omitted.

The number of cells in each row, 'Cell in L-th row[i]', can be determined by the number of rows, 'RowCount'.

Figure 6:
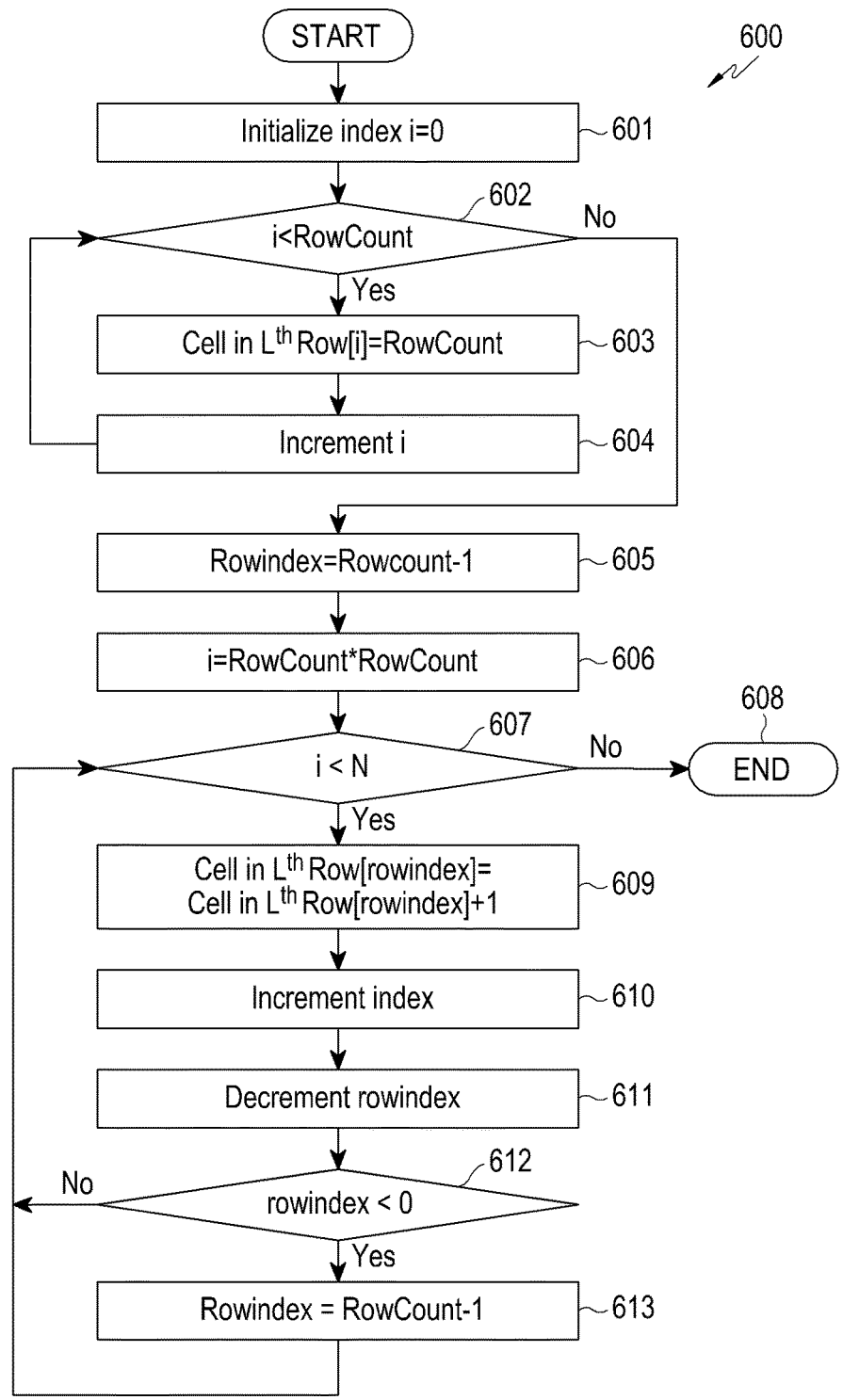
FIG. 6 is a flow chart illustrating a process for determining the number of cells in each row, according to an embodiment of the present invention.

FIG. 6 is a flow chart illustrating a process for determining a number of cells in each row, according to an embodiment of the present invention.

An index 'i' is used to determine a number of cells in each row. The value of index 'i' is initialized as i=0, in step 601. the value of index 'i' is checked against the number of rows 'RowCount', in step 602. If the value of index 'i' is less than the number of rows 'RowCount', then cells in L-th row can be determined by the number or rows 'RowCount', in step 603, as set forth in Equation (3) below.

$$\text{Cell in L-th row}[i] = RowCount \quad (3)$$

After determining the number of cells in L-th row, the value of index 'i' is incremented, in step 604. The incremented value of index 'i' is checked against the number of rows 'RowCount', in step 602. Steps 603 and 604 iterate until there is an equal number of cells in each row. Once the value of index 'i' equals the number of rows, a last row index 'rowIndex' is determined by the number of rows 'RowCount', in step 605. The last row index 'rowIndex' is determined by Equation (4) below.

$$rowIndex = RowCount - 1 \quad (4)$$

The remaining cells are distributed among all the rows equally starting from the bottom. The value of index 'i' is recalculated by the number of rows 'RowCount', in step 606, using Equation (5) below.

$$i = RowCount * RowCount \quad (5)$$

The value of index 'i' is checked against the total number of cells 'N' on the canvas, in step 607. If the value of index 'i' is greater than or equal to the total number of cells 'N' on the canvas, the process terminates at step 608, since as it has no more cells to distribute.

If the value of index 'i' is less than the total number of cells 'N' on the canvas, the number of cells in the L-th row can be incremented by 1, in step 609, based on Equation (6) below.

$$\text{Cell in } L\text{-th row[rowIndex]} = \text{Cell in } L\text{-th row[rowIndex]} + 1 \qquad (6)$$

Further, the value of index 'i' is incremented by 1, in step 610, and the last row index 'rowIndex' is decremented by 1, in step 611. After decrementing, the last row index 'rowIndex' value is checked to determine if it is less than zero. If the last row index 'rowIndex' value is less than zero, then the last row index 'rowIndex' value is determined by decrementing the number of rows 'RowCount' by 1, in step 613, based on Equation (7) below.

$$\text{rowIndex} = \text{RowCount} - 1 \qquad (7)$$

If the last row index 'rowIndex' value is greater than or equal to zero, the index 'i' value is checked against the total number of cells on the canvas 'N', in step 607. The process may iterate steps 609, 610, 611, 612 and 613 until the value of index 'i' is greater than the total number of cells 'N' on the canvas. The various steps of FIG. 6 can be performed in the order presented, in a different order or simultaneously. Further, in some embodiments of the present invention, some steps listed in FIG. 6 can be omitted.

Figure 7:
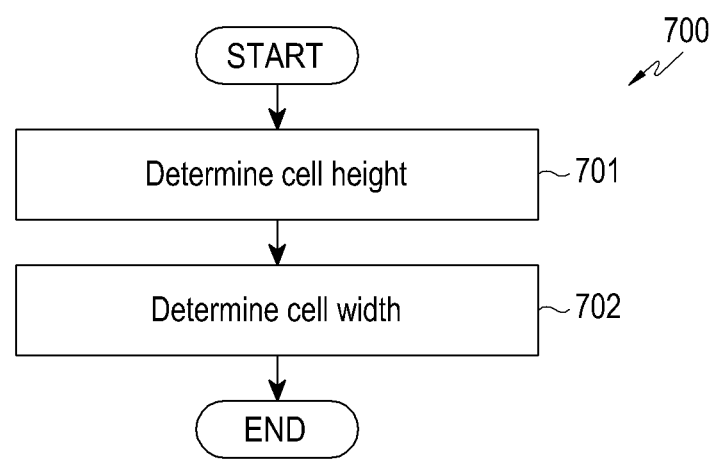
FIG. 7 is a flow chart illustrating a process for determining the dimensions of each cell, according to an embodiment of the present invention.

FIG. 7 is a flow chart illustrating a process for determining the dimensions of each cell, according to an embodiment of the present invention.

Referring to FIG. 7, once the number of cells present in each row is determined, each cell's height 'CellH' is determined by using the number of rows 'RowCount', in step 701, as set forth in Equation (8) below.

$$\text{CellH} = H / \text{RowCount} \qquad (8)$$

where H is the height of the canvas.

Further, each cell's width 'CellW' is determined by using the number of cells in the L-th row, in step 702, as set forth in Equation (9) below.

$$\text{CellW} = W / \text{Cell in } L\text{-th row[rowIndex]} \qquad (9)$$

where W is the width of the canvas.

The various steps of FIG. 7 can be performed in the order presented, in a different order or simultaneously. Further, in some embodiments of the present invention, some steps listed in FIG. 7 can be omitted.

Figure 8:
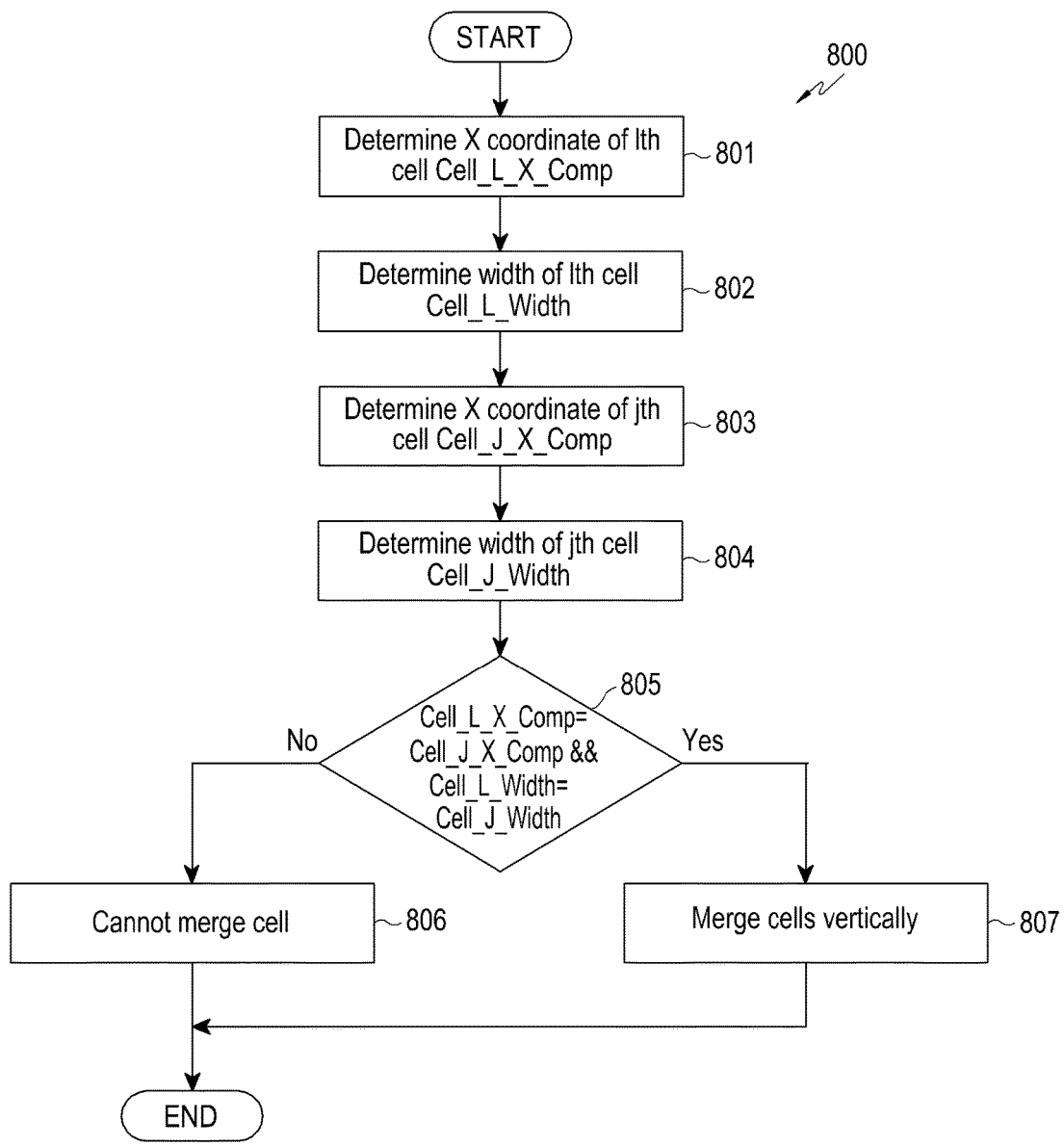
FIG. 8 is a flow chart illustrating a process for vertically merging the cells, according to an embodiment of the present invention.

FIG. 8 is a flow chart illustrating a process for vertically merging cells, according to an embodiment of the present invention.

Referring to FIG. 8, when the number of cells 'N' present on the canvas is greater than the total set of images to be packed, the cells can be merged either vertically or horizontally. The dimensions of a cell are determined. An X coordinate/component of an L-th cell, 'Cell_L_X_Comp', is determined, in step 801. A width of the L-th cell, 'Cell_L_Width', can be determined, in step 802. An X coordinate/component of a J-th cell, 'Cell_J_X_Comp', is determined, in step 803. A width of the J-th cell, 'Cell_J_Width', is determined, in step 804.

The X coordinate/component of the L-th cell 'Cell_L_X_Comp' is compared against the X coordinate of the J-th cell 'Cell_J_X_Comp', and the width of the L-th cell 'Cell_L_Width' is compared against the width of the J-th cell 'Cell_J_Width', in step 805.

As a result of the comparison, if the dimensions of the L-th cell and J-th cell are equal, then the L-th and J-th cells can be merged, in step 807, and a single cell can be formed whose height can be the sum of the heights of L-th and J-th cells.

However, if the dimensions of the L-th and J-th cells are not equal, the L-th and J-th cells cannot be merged, in step 806.

The various steps of FIG. 8 can be performed in the order presented, in a different order or simultaneously. Further, in some embodiments of the present invention, some steps of FIG. 8 can be omitted.

Figure 9:
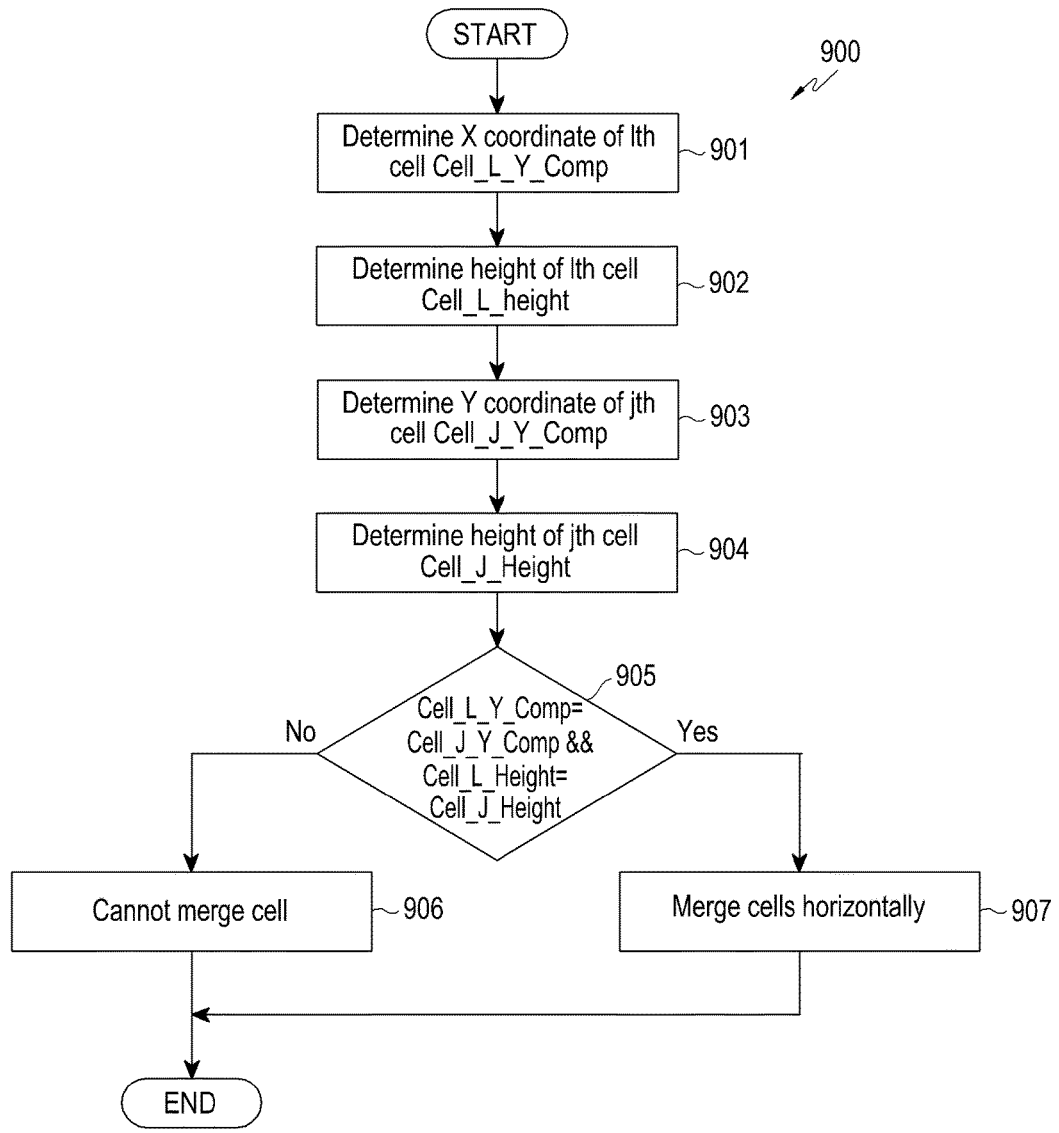
FIG. 9 is a flow chart illustrating a process for horizontally merging the cells, according to an embodiment of the present invention.

FIG. 9 is a flow chart illustrating a process to merge the cells horizontally, according to an embodiment of the present invention.

Referring to FIG. 9, the dimensions of a cell can be determined. A Y coordinate/component of the L-th cell 'Cell_L_Y_Comp' is determined, in step 901. A height of the L-th cell 'Cell_L_Height' is determined, in step 902. A Y coordinate/component of the J-th cell 'Cell_J_Y_Comp' is determined, in step 903. A height of the J-th cell 'Cell_J_Height' is determined, in step 904.

The Y coordinate of the L-th cell 'Cell_L_Y_Comp' is compared against the Y coordinate/component of the J-th cell 'Cell_J_Y_Comp', and the height of the L-th cell 'Cell_L_Height' is compared against the height of the J-th cell 'Cell_J_Height', in step 905.

As a result of comparison, if the dimensions of the L-th cell and J-th cell are equal, then the L-th and J-th cells can be merged, in step 907, and a single cell can be formed whose width can be the sum of the widths of L-th and J-th cells.

However, if the dimensions of the L-th and J-th cells are not equal, the L-th and J-th cells cannot be merged, in step 906.

The steps of FIG. 9 can be performed in the order presented, in a different order or simultaneously. Further, in some embodiments of the present invention, some steps of FIG. 9 can be omitted.

Figure 10:
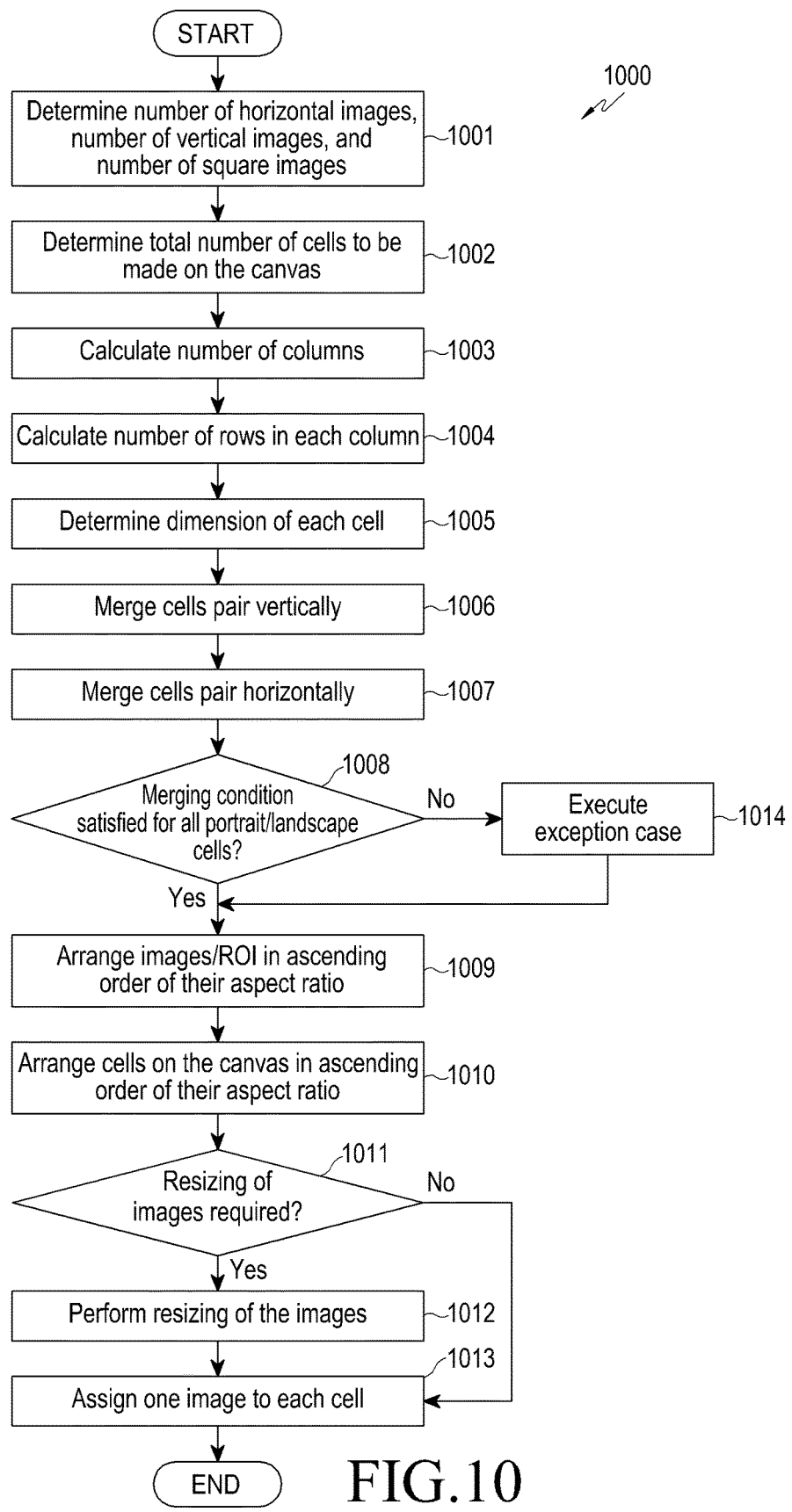
FIG. 10 is a flow chart illustrating a process of image placement when a canvas has a portrait orientation, according to an embodiment of the present invention.

FIG. 10 is a flow chart illustrating a process of image placement when a canvas has a portrait orientation, according to an embodiment of the present invention.

Referring to FIG. 10, the images to be packed are categorized according to their aspect ratios. Among the input images, the numbers of images having landscape, portrait, and square orientations are determined, in step 1001. The total number of cells 'N' to be made on the canvas is determined, in step 1002, by adding the total number of input images 'M', the number of input images having a landscape orientation 'K1', and the number of input images having a portrait orientation 'K2', in accordance with Equation (10) below.

$$N = M + K1 + K2 \qquad (10)$$

The canvas is fragmented into one or more of columns, in step 1003. The number of columns, 'ColCount', on the canvas is determined by taking the square root of the total number of cells created on the canvas as set forth in Equation (11) below.

$$\text{ColCount} = \sqrt{N} \qquad (11)$$

The number of rows in each column is calculated, in step 1004, as described in detail below with respect to FIG. 11, and the dimensions of each cell is determined, in step 1005, as described in detail below with respect to FIG. 12.

Once, the dimensions of each cell is determined, the extra cells present on the canvas are merged. A pair of identically-dimensioned cells, which lie in different rows but in the same column, are vertically merged, in step 1006. Vertical merging of the cells is described in greater detail with reference to FIG. 8. A pair of identically-dimensioned cells, which lie in the same row and adjacent to each other, are horizontally merged, in step 1007. Horizontal merging of the cells is described in greater detail with reference to FIG. 9.

All of the portrait and/or landscape orientation cells can be checked to determine if they satisfy the aforementioned merging conditions, in step 1008. If one or more of the portrait and/or landscape orientation cells do not satisfy the merging conditions, the extra cells need to be reduced. The extra cells are reduced by executing the exception case, in step 1014. The exception case is described in greater detail below with reference to FIG. 13.

Once the identical portrait cells and landscape cells are merged, the number of cells on the canvas is equal to the number of images to be packed. The images or ROI, which need to be packed on the canvas, are sorted in ascending order based on their aspect ratios, in step 1009.

The cells on the canvas are sorted in ascending order based on their aspect ratio, in step 1010. The sizes of the images are checked against the sizes of the cells to determine if the images can fit into the cell, in step 1011. If the sizes of the images do not map to the size of the cells, the images are resized according to the sizes of the cells in order to fit properly in to the cells, in step 1012. Properly sized images are assigned to each cell in step 1013, thereby creating an artistic pattern of the packed images.

The various steps of FIG. 10 can be performed in the order presented, in a different order or simultaneously. Further, in some embodiments of the present invention, some steps of FIG. 10 can be omitted.

The number of cells in each column 'Cell in L-th col[i]' can be determined by the number of columns 'ColCount'.

Figure 11:
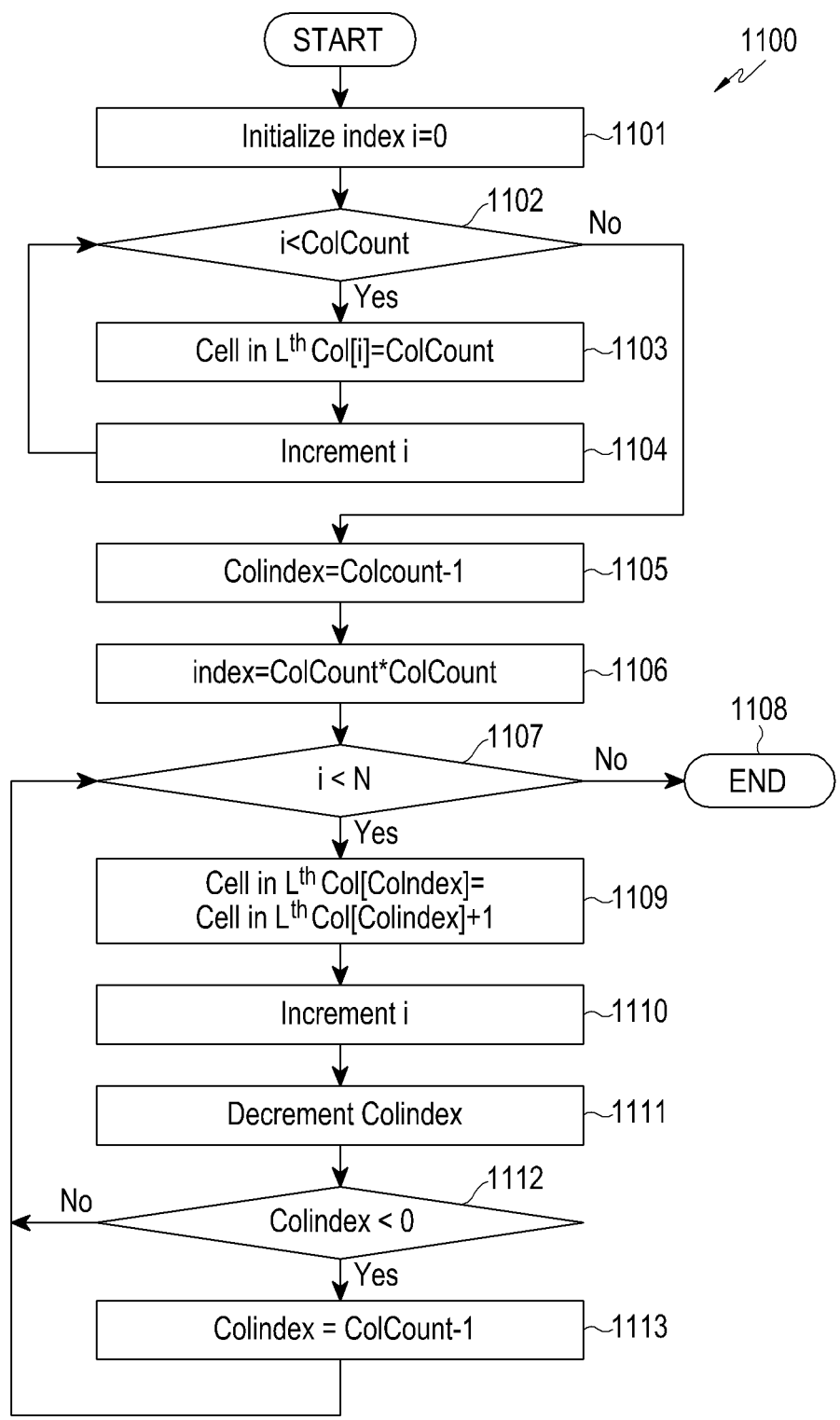
FIG. 11 is a flow chart illustrating a process for determining the number of cells in each column, according to an embodiment of the present invention.

FIG. 11 is a flow chart illustrating a process for determining a number of cells in each column, according to an embodiment of the present invention.

Referring to FIG. 11, an index 'i' can be used to determine a number of cells in each row. The value of index 'i' is initialized as i=0, in step 1101. The value of index 'i' is checked against the number of columns 'ColCount', in step 1102. If the value of index 'i' is less than the number of columns 'ColCount', cells in L-th column are determined by the number or columns 'ColCount', in step 1103, in accordance with Equation (12) below.

Cell in L-th col [i]=ColCount (12)

After determining the number of cells in the L-th column, the value of index 'i' is incremented, in step 1104. The incremented value of index 'i' is checked against the number of columns 'ColCount', in step 1102. Steps 1103 and 1104 iterate until an equal number of cells are placed in each column. Once the value of index 'i' equals the number of columns, a last column index 'colIndex' is determined by the number of columns 'ColCount', in step 1105, in accordance with Equation (13) below.

colIndex=ColCount−1 (13)

The remaining cells are distributed among all the columns equally starting from right column. The value of index 'i' is recalculated by the number of columns 'ColCount', in step 1106, in accordance with Equation (14) below.

i=ColCount*ColCount (14)

The value of index 'i' is checked against the total number of cells 'N' on the canvas, in step 1107. If the value of index 'i' is greater than the total number of cells 'N' on the canvas, the process stops at step 1108, as it has not more cells to distribute.

If the value of index 'i' is less than the total number of cells 'N' on the canvas, then the number of cells in the L-th column is incremented by 1, in step 1109, in accordance with Equation (15) below.

Cell in L-th col [colIndex]=Cell in L-th col [colIndex]+1 (15)

the value of index 'i' is incremented by 1, in step 1110, and the last column index 'colIndex' is decremented by 1, in step 1111. After decrementing, the last column index 'colIndex' value can be checked to determine if its value is less than zero, in step 1112. If the right column index 'colIndex' value is less than zero, the right column index 'colIndex' value can be determined by decrementing the number of columns 'ColCount' by 1, in step 1113, in accordance with Equation (16) below.

colIndex=ColCount−1 (16)

However, if the right column index 'colIndex' value is greater than or equal to zero, the value of index 'i' is checked against the total number of cells on the canvas 'N', in step 1107. The process may iterate steps 1109, 1110, 1111, 1112 and 1113 until the value of index 'i' becomes greater than the total number of cells 'N' on the canvas and stops the process.

The various steps of FIG. 11 can be performed in the order presented, in a different order or simultaneously. Further, in some embodiments of the present invention, some steps of FIG. 11 can be omitted.

Figure 12:
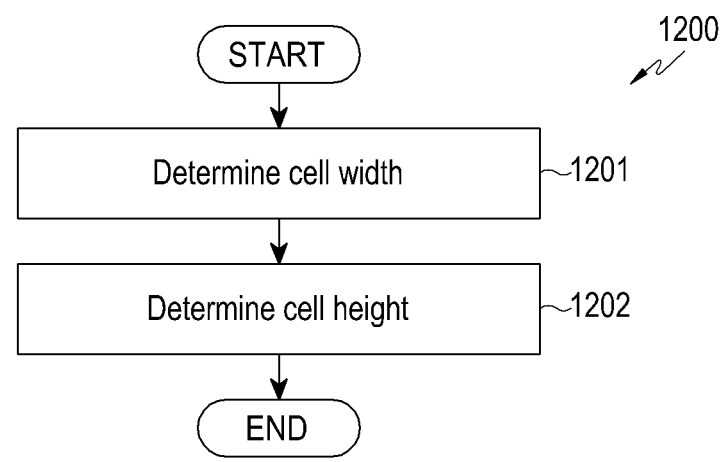
FIG. 12 is a flow chart illustrating a process for determining the dimensions of each cell, according to an embodiment of the present invention.

FIG. 12 is a flow chart illustrating a process for determining the dimensions of each cell, according to an embodiment of the present invention.

Referring to FIG. 12, once the number of cells present in each column is determined, each cell's width 'CellW' can be determined by using the number of columns 'ColCount', in step 1201, in accordance with Equation (17) below.

CellW=W/ColCount (17)

where W is the width of the canvas.

Each cell's height 'CellH' can be determined by using then the number of cells in the L-th column, in step 1202, in accordance with Equation (18) below.

CellH=H/Cell in L-th col [colIndex] (18)

where H is the height of the canvas

The various steps of FIG. 12 can be performed in the order presented, in a different order or simultaneously. Further, in some embodiments of the present invention, some steps of FIG. 12 can be omitted. Identical portrait and landscape orientation cells can be merged together by executing aforementioned techniques.

Figure 13:
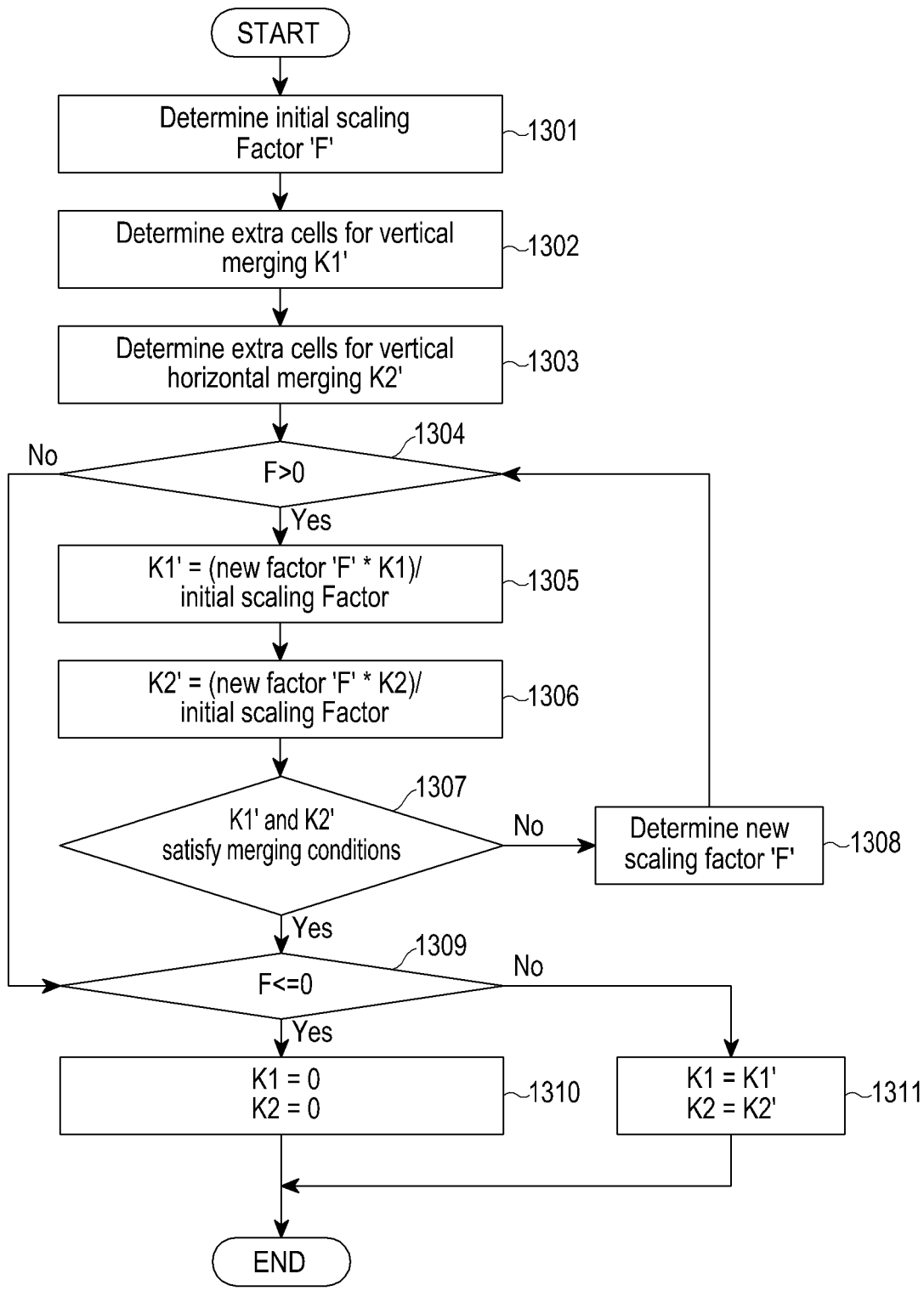
FIG. 13 is a flow chart illustrating a process when landscape and/or portrait orientation cells fail to satisfy a merging condition, according to an embodiment of the present invention.

FIG. 13 is a flow chart illustrating a process when landscape and/or portrait orientation cells fail to satisfy the merging condition, according to an embodiment of the present invention.

Referring to FIG. 13, a scaling factor 'F' is determined, in step 1301. Extra portrait K1' orientation cells are determined for merging, in step 1302. Extra landscape K2' orientation cells are determined for merging, in step 1303.

The value of scaling factor 'F' is checked to determine whether it is greater than zero, in step 1304. If the value of scaling factor 'F' is not greater zero, it is determined whether the scaling factor 'F' is less than or equal to zero, in step 1309. If the value of scaling factor 'F' is greater than zero, the extra portrait K1' orientation cells are merged by resizing the cell according to the landscape orientation images K1, in step 1305, in accordance with Equation (19) below.

K1'=(New factor 'F'*K1)/Initial scaling factor (19)

The extra landscape K2' orientation cells are merged by resizing the cell according to the portrait orientation images K2, in step 1306, in accordance with Equation (20) below.

$$K2'=(\text{New factor 'F'}*K2)/\text{Initial scaling factor} \quad (20)$$

The extra portrait K1' orientation cells and landscape K2' orientation cells are analyzed to determine whether they satisfy the aforementioned merging condition, in step 1307. If one or more of the extra portrait K1' orientation cells and landscape K2' orientation cells do not satisfy the merging condition, a new scaling factor 'F' is determined by scaling down the original scaling factor with an appropriate value, in step 1308.

It is then determined whether the new scaling factor value is greater than zero, in step 1304. Steps 1304, 1305, 1306 and 1307 iterate until a merging condition is achieved or the scaling factor 'F' value becomes less than or equal to zero.

If all of the extra portrait K1' orientation cells and the landscape K2' orientation cells satisfy the merging condition, it is determined whether the scaling factor value is less than or equal to zero in step 1309.

If the scaling factor 'F' is less than or equal to zero, the landscape orientation images K1 and the portrait orientation images K2 are assigned to zero, in step 1310.

However, if the scaling factor 'F' is greater than zero, then extra portrait K1' orientation cells are assigned to the landscape orientation images K1 and the landscape K2' orientation cells are assigned to the portrait orientation images K2, in step 1311.

The various steps in FIG. 13 are performed in the order presented, in a different order or simultaneously. Further, in some embodiments of the present invention, some steps of FIG. 13 can be omitted.

The embodiments of the present invention can be implemented through at least one software program running on at least one hardware device and performing network management functions to control the network elements. The network elements shown in FIG. 1 include blocks, which can be at least one of a hardware device, or a combination of hardware device and software module.

The embodiments of the present invention provide methods and systems to enable customization of an application to enhance user experience on a computing device by having one or more resident client entities negotiate with one or more client execution entities or a server on aspects of said application that can be customized. Therefore, it is understood that the scope of the protection is extended to such a program, and in addition, to a computer readable means having a message therein, such computer 102 readable storage means contain program code means for implementation of one or more steps of the method, when the program runs on a server or mobile device or any suitable programmable device. The method is implemented in a embodiment through or together with a software program written in e.g. Very high speed integrated circuit Hardware Description Language (VHDL) programming language, or implemented by one or more VHDL or several software modules being executed on at least one hardware device. The hardware device can be any kind of portable device that can be programmed. The device can also include means, which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the embodiments of the present invention can be implemented on different hardware devices, e.g. using a plurality of CPUs.

By providing a method and device for packing, visual contents can be efficiently packed on a canvas without overlapping visual contents having various sizes and aspect ratios or changing the aspect ratios of the contents, while avoiding an empty space.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for packing a plurality of images, the method comprising:
   determining, based on an image orientation of each of the plurality of images, a total number of cells of a canvas on which the plurality of images having landscape and portrait orientations are to be packed;
   merging at least one pair of cells on the canvas into a combined cell such that the total number of the cells on the canvas is reduced to a total number of the plurality of images; and
   placing each of the plurality of images in a corresponding one of the cells on the canvas, according to respective aspect ratios of the plurality of images, when the total number of the cells is reduced to the total number of the plurality of images,
   wherein the total number of the cells on the canvas prior to the merging is equal to a sum of the total number of the plurality of images, a total number of landscape orientation images among the plurality of images, and a total number of portrait orientation images among the plurality of images.

2. The method of claim 1, further comprising:
   determining the total number of the plurality of images to be placed on the canvas;
   determining a dimension of the canvas to determine whether the canvas has a landscape orientation or a portrait orientation; and
   categorizing the plurality of images to be placed on the canvas according to the aspect ratios of the plurality of images.

3. The method of claim 1, further comprising calculating, based upon the total number of cells of the canvas, a total number of rows of cells of the canvas in the landscape orientation, and a total number of cells for each row of the canvas.

4. The method of claim 1, further comprising calculating, based upon the total number of cells of the canvas, a total number of columns of cells of the canvas in the portrait orientation, and a total number of cells for each column of the canvas.

5. The method of claim 1, wherein merging the cells comprises:
   vertically merging a pair of cells having same dimensions and lying in different rows of a same column; and horizontally merging a pair of cells having same dimensions and lying adjacent to each other in a same row.

6. The method of claim 1, wherein placing the plurality of images comprises:
sorting the plurality of images according to the aspect ratios;
sorting the merged cells according to the aspect ratios;
comparing a size of an image with a size of a cell on which the image is to be placed in an order they are sorted;
resizing the image and placing the image on the cell when the size of the image and the size of the cell on which the image is to be placed do not match; and
when the size of the image and the size of the cell on which the image is to be placed match, placing the image on the cell.

7. An image capturing device for packing a plurality of images, the image capturing device comprising:
a memory for storing the plurality of images; and
a processing unit for determining, based on an image orientation of each of the plurality of images, a total number of cells of a canvas on which the plurality of images having landscape and portrait orientations are to be packed, merging at least one pair of cells on the canvas into a combined cell such that the total number of the cells on the canvas is reduced to a total number of the plurality of images, and placing each of the plurality of images in a corresponding one of the cells on the canvas, according to respective aspect ratios of the plurality of images, when the total number of the cells is reduced the total number of the plurality of images,
wherein the total number of the cells on the canvas prior to the merging is equal to a sum of the total number of the plurality of images, a total number of landscape orientation images among the plurality of images, and a total number of portrait orientation images among the plurality of images.

8. The image capturing device of claim 7, wherein the processing unit determines the total number of the plurality of images to be placed on the canvas, determines a dimension of the canvas to determine whether the canvas has a landscape orientation or a portrait orientation, and categorizes the plurality of images to be placed on the canvas according to the aspect ratios of the plurality of images.

9. The image capturing device of claim 7, wherein the processing unit calculates, based on the total number of cells of the canvas, a total number of rows of cells of the canvas in the landscape orientation and a total number of cells for each row of the canvas.

10. The image capturing device of claim 7, wherein the processing unit calculates, based on the total number of cells of the canvas, a total number of columns of cells of the canvas in the portrait orientation of the canvas and a total number of cells for each column of the canvas.

11. The image capturing device of claim 7, wherein the processing unit vertically merges a pair of cells having same dimensions and lying in different rows of a same column, and horizontally merges a pair of cells having same dimensions and lying adjacent to each other in a same row.

12. The image capturing device of claim 11, wherein the processing unit generates a scaling factor when cells having the same dimensions do not exist, resizes landscape-oriented cells according to landscape-oriented images using the scaling factor and merges the resized landscape-oriented cells, and resizes portrait-oriented cells according to portrait-oriented images using the scaling factor and merges the resized portrait-oriented cells.

13. The image capturing device of claim 11, wherein a total number of cells merged vertically is equal to a total number of portrait-oriented images among the plurality of images, and a total number of cells merged horizontally is equal to a total number of landscape-oriented images among the plurality of images.

14. The image capturing device of claim 7, wherein the processing unit sorts the plurality of images according to the aspect ratios, sorts the merged cells according to the aspect ratios, compares a size of an image with a size of a cell on which the image is to be placed in an order they are sorted, resizes the image and places the image on the cell when the size of the image and the size of the cell on which the image is to be placed do not match, and when the size of the image and the size of the cell on which the image is to be placed match, places the image on the cell.

15. The method of claim 1, wherein the total number of cells of the canvas is determined based on the total number of the plurality of images, a total number of landscape orientation images among the plurality of images, and a total number of portrait orientation images among the plurality of images.

16. The image capturing device of claim 7, wherein the total number of cells of the canvas is determined based on the total number of the plurality of images, a total number of landscape orientation images among the plurality of images, and a total number of portrait orientation images among the plurality of images.

17. A non-transitory computer-readable storage medium with instructions stored therein which upon execution cause at least one processor to:
determine, based on an image orientation of each of a plurality of images, a total number of cells of a canvas on which the plurality of images having landscape and portrait orientations are to be packed;
merge at least one pair of cells on the canvas into a combined cell such that the total number of the cells on the canvas is reduced to a total number of the plurality of images; and
place each of the plurality of images in a corresponding one of the cells on the canvas, according to respective aspect ratios of the plurality of images, when the total number of the cells is reduced to the total number of the plurality of images,
wherein the total number of the cells on the canvas prior to the merging is equal to a sum of the total number of the plurality of images, a total number of landscape orientation images among the plurality of images, and a total number of portrait orientation images among the plurality of images.

18. The non-transitory computer-readable storage medium of claim 17, wherein the instructions further cause the at least one processor to:
determine the total number of the plurality of images to be placed on the canvas;
determine a dimension of the canvas to determine whether the canvas has a landscape orientation or a portrait orientation; and
categorize the plurality of images to be placed on the canvas according to the aspect ratios of the plurality of images.

19. The non-transitory computer-readable storage medium of claim 17, wherein the instructions further cause the at least one processor to:

vertically merge a pair of cells having same dimensions and lying in different rows of a same column; and
horizontally merge a pair of cells having same dimensions and lying adjacent to each other in a same row.

20. The non-transitory computer-readable storage medium of claim 17, wherein the instructions further cause the at least one processor to:
sort the plurality of images according to the aspect ratios;
sort the merged cells according to the aspect ratios;
compare a size of an image with a size of a cell on which the image is to be placed in an order they are sorted;
resize the image and placing the image on the cell when the size of the image and the size of the cell on which the image is to be placed do not match; and
when the size of the image and the size of the cell on which the image is to be placed match, place the image on the cell.

* * * * *